Dec. 26, 1961   G. A. TELZROW   3,014,718
MODEL AIRCRAFT CONTROL
Filed Oct. 21, 1958   3 Sheets-Sheet 1
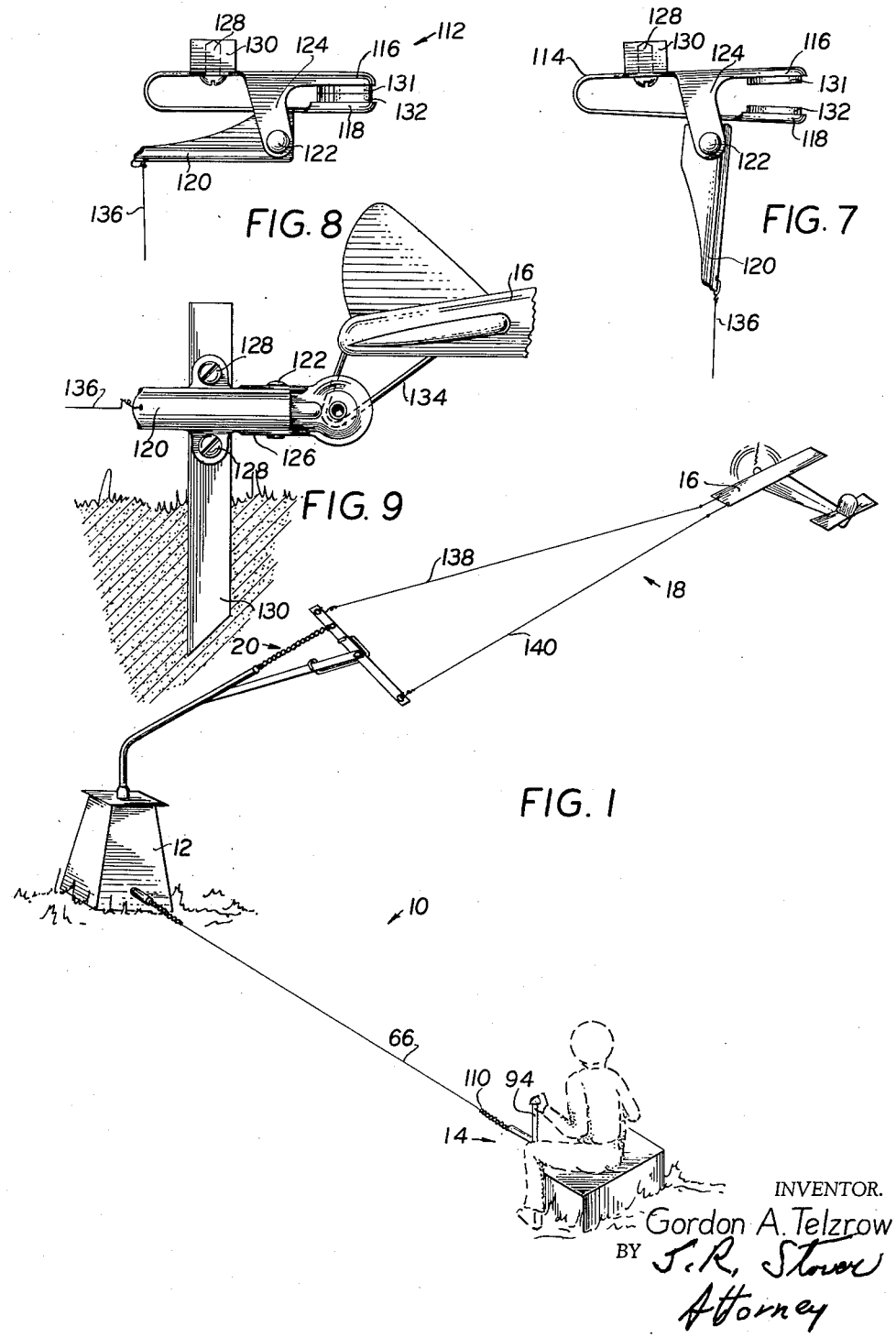
INVENTOR.
Gordon A. Telzrow
BY J. R. Stover
Attorney Dec. 26, 1961   G. A. TELZROW   3,014,718
MODEL AIRCRAFT CONTROL
Filed Oct. 21, 1958   3 Sheets-Sheet 2

INVENTOR.
Gordon A. Telzrow
BY J. R. Stover
Attorney

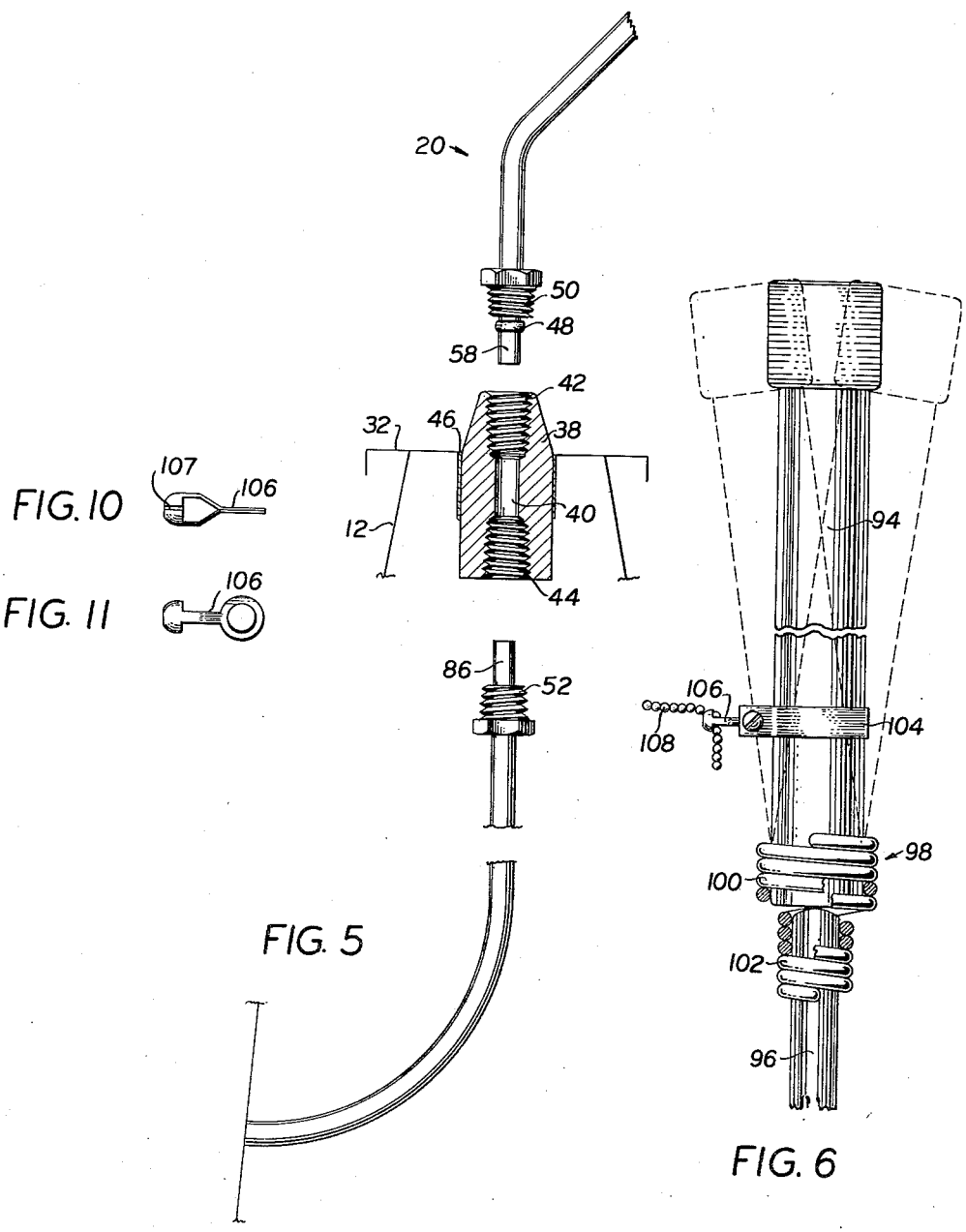

United States Patent Office 3,014,718
Patented Dec. 26, 1961

3,014,718
MODEL AIRCRAFT CONTROL
Gordon A. Telzrow, 6913 Sprague Road,
Independence, Ohio
Filed Oct. 21, 1958, Ser. No. 768,590
4 Claims. (Cl. 272—31)

This invention relates to a portable control mechanism for model aircraft structures wherein a pylon or tower is utilized to control the flight of the aircraft and a controlling mechanism is placed outside the flight circle of the aircraft and is operatively connected with the pylon structure so that an operator can control and select the flight attitude of the controlled aircraft structure.

In devices heretofore known which are of the remote control type, suitable control lines, cables, wires or ropes emanate from the pylon and are suitably connected to elevator portions of the aircraft to control the flight path. Since the model aircraft flies in a generally circular path due to the control connection with the pylon, ordinary lines or wires become twisted or "wound-up" as the circular flight pattern is repeated. To obviate this difficulty, various complicated structures have been proposed to provide a universal connection between the pylon control means and the aircraft control wires. The invention disclosed herein overcomes the inherent drawbacks and difficulties in devices heretofore known and provides a structure which is simple, inexpensive and efficient in carrying out the disclosed objects and purposes of the invention.

An object of this invention is to provide a portable, restricted flight path aircraft control means which is designed for single operator setup and flight control.

Another object of the invention is to provide a combination cockpit type control and pylon operating structure wherein means is provided to prevent tangling, twisting and "winding-up" of a flexible means disposed partially within the pylon structure which serves to connect the aircraft control lines with the cockpit control.

Yet another object is to provide a complete mechanism for controlling the flight of a model aircraft and which is easily disassembled and can be transported with a minimum of effort.

Still another object is to provide an aircraft securing and launching structure operable from the control cockpit and which is selectively releasable to render the aircraft free for controlled flight from the pylon which is operatively connected with the cockpit control structure.

Another object of the invention is to provide a cockpit controlled model aircraft structure wherein the operator is free to control the aircraft from outside the flight path of the craft which eliminates dizziness and operator fatigue.

These and other objects and advantages will become more apparent from the following detailed description of the device and the accompanying drawings, wherein:

FIGURE 1 is a perspective view of the novel pylon and cockpit control means disclosed herein.

FIGURE 5 is an exploded view of the control arm mounting base structure;

FIGURE 6 is an enlarged detail view of the control stick structure;

FIGURE 7 is a detail view of the releasing mechanism in a closed position;

FIGURE 8 is another detail view of the releasing mechanism in an open position;

FIGURE 9 is a side view of the releasing mechanism;

FIGURE 10 is a top view of the chain coupling; and

FIGURE 11 is a side view of the chain coupling.

Figures 2, 3, 4:
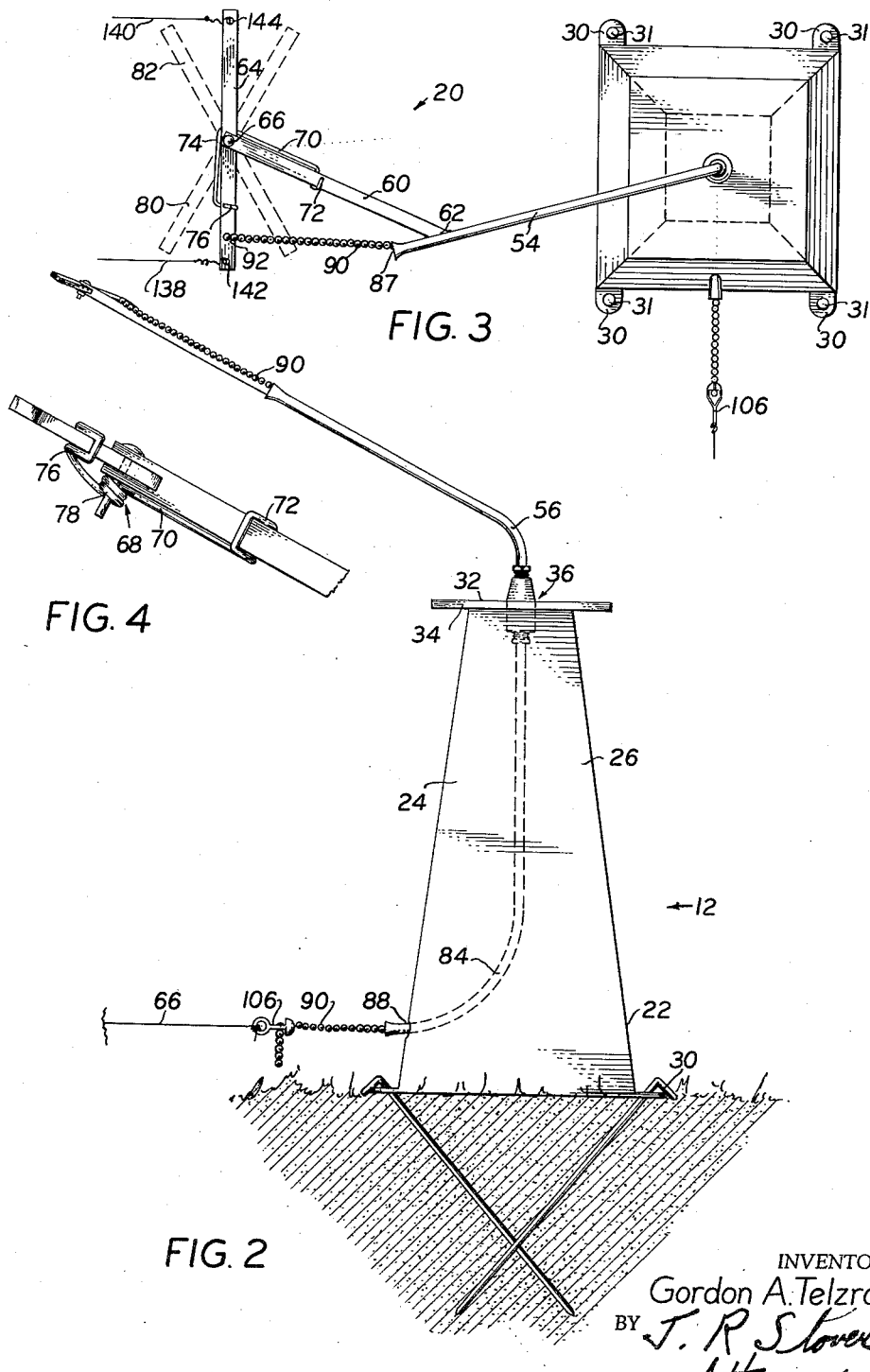
FIGURE 2 is a detailed view of the pylon assembly.
FIGURE 3 is a plan view of the pylon and control arm structure.
FIGURE 4 is a detail view of a portion of the control arm.

Briefly, this invention is comprised of a pylon having a base portion suitably anchored in the ground or on an operating base and a control arm mounting base disposed on a top portion of the pylon and being provided with a portion which is free to rotate with respect to the pylon. A control arm assembly is fixed to the control arm mounting base and is comprised of a first arm portion rotatably mounted in the control arm mounting base and a second arm portion connected to the first arm adjacent the outer end thereof and having a free end disposed laterally of the end of the first arm portion.

A control transmission bar is pivoted intermediate its end portions on the free end of the second arm portion of the control arm assembly and a light coil spring or other suitable resilient means is connected adjacent the pivoted portion of the control transmission bar and the second arm portion of the control arm assembly. A universal swivel type beaded chain is connected to a free end of the conrol transmission bar and extends through the first arm portion of the control arm assembly and out through a guide tube which has one end disposed in the control arm mounting base and a free end terminating adjacent an outer wall portion of the lower part of the pylon.

The free end of the beaded chain is connected to a line or wire which is in turn connected to an intermediate portion of a control stick which is used to control the model aircraft.

Conventional model airplane control lines are connected to the control transmission bar and are also connected to the model aircraft structure which is to be controlled.

When the operator pul's back on the control stick, the beaded chain is pulled downwardly through the guide tube which results in angular movement of the control transmission bar in a direction to bias the resilient means which is connected between the transmission bar and the second arm portion of the control arm assembly. When the control transmission bar is angularly displaced, the airplane control lines are linearly moved in a manner to cause the aircraft to climb upwardly.

When it is desired to make the aircraft dive, the operator pushes the control stick forward and thus releases the tensile pull of the chain on the control transmission bar and allows the bar to move in the opposite angular direction due to the force imposed on the bar by the resilient means connected between the bar and the second arm portion of the control arm assembly. This angular movement of the transmission bar causes linear displacement of the airplane control lines in the opposite direction, thus causing the aircraft to assume a diving position.

Referring to the drawing for a more detailed description of the novel structure disclosed herein, a combination pylon and aircraft type control device 10 is comprised of a pylon 12 and an aircraft type control assembly 14. A model aircraft structure 16 is adapted to be controlled by a conventional control line assembly 18 which is connected to a control means or control arm assembly 20 in a manner which will hereinafter be described in more detail.

Referring to FIGURES 2 and 3, a tower or pylon 12 is comprised of a stamped, sheet metal, lateral wall assembly 22 which consists of two identical sheet metal, tapered channel portions 24, 26, which are spot welded or otherwise suitably connected together on vertical overlapping seam portions (not shown) disposed either at opposite corners of the pylon or substantially midway in opposite side wall portions. The lateral wall assembly is provided with securing tabs 30 disposed at each corner of base assembly 22. Each of the tabs is provided with a hole 31 to suitably stake the pylon in the ground or to an operating base.

A pylon top plate or roof 32 is provided with a downturned flange portion 34 to add rigidity to roof 32 as well as to function as a protecting means. The top plate is spot-welded or bolted to wall assembly 22 along a conventional upper flange portion (not shown) of the wall assembly.

A control arm mounting base assembly 36 (FIGURES 2 and 5) is comprised of a base 38 which is manufactured as a screw machine product and is provided with an intermediate axial hole 40, and coaxial upper and lower end holes 42 and 44, respectively, forming a continuous annular opening in base 38. This base portion is suitably attached, as by brazing, or by a tight frictional fit, to a flanged hole 46 in roof 32 of pylon 12. A lower end portion of control arm assembly 20 is receivable in threaded hole 42 and is provided with a compression ferrule 48 and a taper thread fitting 50, receivable in threaded hole 42, which allows the control arm assembly to rotate with respect to base 38 but maintains the structure in assembly. This assembled relationship is maintained because compression ferrule 48 is axially fixed on the lower end portion of control arm assembly 20 and abutment of ferrule 48 against the bottom of fitting 50 and the bottom of hole 42 restricts vertical movement of assembly 20. A lower taper thread fitting 52 cooperates with a guide tube shown in FIGURES 2 and 5 and will be hereinafter described in greater detail.

A control arm assembly 20 is comprised of a first arm portion 54 preferably formed of steel tubing and bent to form a relatively long radius at 56 so that lower end portion 58 is receivable in base 38. A second arm portion 60 is connected near the free end of arm 54 by a weld or other suitable means at 62. The second arm portion 60 is formed of solid material, such as a steel bar, but can also be made as a tubular element or as bar means.

A control transmission bar 64 is pivotally attached at its midpoint to the free end of second arm portion 60 by a bolt or pin 66. A coil spring assembly 68 is comprised of a first arm 70 and a finger 72 in gripping engagement with arm 60. A second arm 74 is disposed substantially parallel with transmission bar 64 and a finger 76 is in gripping engagement with bar 64. A coil spring portion 78 is coiled in a manner to bias transmission bar 64 to a first extreme position 80 of two extreme positions 80, 82 (shown dotted in FIGURE 3).

A guide tube 84 is preferably formed of steel tubing and is provided with end portion 86 which is receivable in hole 44 of control arm mounting base 38 and is held therein by fitting 52. The other end of guide tube 84 is flared at 87 and is suitably connected near the end, as by brazing, to wall portion 24 where the guide tube passes through the wall portion at 88.

A continuous, universal swivel type beaded chain 90 is suitably connected at 92 to control transmission bar 64 and passes down through first arm portion 54, base 38, guide tube 84 and terminates a few inches outside the flared end of guide tube 84. A line or wire 66 is connected to the free end of beaded chain 90 and extends to control assembly 14.

The control assembly 14 is comprised of a control stick 94 and a ground anchoring stake 96, as shown enlarged in FIGURE 6. Obviously, an anchoring base and stake could be substituted for stake 96 if it is desired to operate the mechanism on any hard surfaces either indoors or outdoors. A universal coil spring means 98 is comprised of a large diameter portion 100 and a small diameter portion 102 which frictionally grip control stick 94 and stake 96, respectively. This arrangement permits movement of the control stick in any direction and the parts can be easily and quickly disassembled. A circular clamp 104 is adjustably mounted on control stick 94 and holds a chain coupling 106 when the clamp is tightened on control stick 94. One end of a beaded chain 108 is connected by means of chain coupling 106 to control stick 94 and the other end of chain 108 is suitably attached at 110 to wire 66. It is to be noted that the "sensitivity" of control stick 94 can be varied by loosening clamp 104 and moving it longitudinally on the stick to an appropriate position to either increase or decrease the linear displacement of wire 66 for a given amount of movement of the control stick. Also, the positioning of control bar 64 with respect to the neutral position of control stick 94 can be quickly adjusted by repositioning chain 108 in chain coupling 106 and thereby select the operative length of chain 108. This is accomplished by removing and then repositioning chain 108 in slot 107 of chain coupling 106, shown in detail in FIGURES 10 and 11.

Referring to FIGURES 7, 8 and 9, a remote controlled releasing mechanism 112 is comprised of a holding clamp 114 consisting of laterally spaced arms 116 and 118. A cam lever 120 is pivotally mounted on a pin 122 which is supported by lever mounting brackets 124, 126. Bracket 114 is fastened through the base portion by 2 machine screws 128 turned into tapped holes in a stake 130. When lever 120 is moved to a position substantially perpendicular to arms 116, 118, as in FIGURE 7, pads 131, 132, clamp tail skid 134 of model aircraft 16. When the lever is moved to the position shown in FIGURE 8, the aircraft is released. Lever 120 is provided with an operating line 136 and extends to a position within convenient reach of the operator so that the lever can be moved to a releasing position by the operator when he is in a position to operate the control stick. This novel arrangement makes the mechanism very safe to operate since the operator is in complete control of the model aircraft from the instant the aircraft is released.

Referring again to FIGURE 3, a pair of conventional model airplane control lines 138, 140 are connected to control transmission bar 64 by hooks or by tying at 142, 144, respectively, and extend in a conventional manner to the tail surface control portions of the model aircraft so that linear movement of the control lines in opposite directions causes either diving or climbing of the aircraft. It is to be noted that control lines 138, 140 can also serve as current transmitting wires to the model aircraft to control relay circuits which operate main control means to drop bombs, operate lights, release landing parachute and many other accessory functions which might be desired.

In order to more clearly understand the operation of the novel structure disclosed herein, a typical operating cycle is set forth as follows.

The mechanism is set up so that the radius of the aircraft operating circle is less than the distance from the pylon to the cockpit. The airplane is then in full view of the operator at all times and thereby facilitates easier and safer operation.

The tail skid assembly 134 of aircraft 16 is inserted between arms 116, 118 of holding bracket 114 and lever 120 is moved to the position shown in FIGURE 8 so as to clamp the tail skid and thus secure the aircraft to the releasing mechanism. The aircraft engine can be started either before or after the model is anchored to the releasing mechanism but starting the engine when the aircraft is securely anchored is the safer method of operation.

The operator is now ready to assume a position to operate the control stick and when it is desired to release the airplane for flight, line 136 is pulled toward the operator thus freeing the airplane for flight. Simultaneously, the control stick is pulled back to insure that the airplane will climb steadily upward as in a conventional "take-off."

The control stick is used to control the flight of the aircraft by either pushing forward or pulling back on the stick. When the stick is pulled back, beaded chain 90 is moved linearly toward the control stick resulting in a downward movement of the chain in the pylon. This chain movement causes control transmission bar 64 to move angularly with respect to second arm portion 60 and effects linear movement of control lines 138 and 140.

If it is desired to dive the aircraft, the control stick is moved forward thus allowing spring means 68 to swing control transmission bar 64 to dotted position 80 in FIGURE 3 and reverse the linear movement of control lines 138, 140. Obviously, the control stick can be moved to any intermediate position to effect less severe upward and downward movement of the aircraft and to a neutral position for level flight.

It is to be particularly noted that regardless of the position of flight, the universal swivel type beaded chain prevents tangling or "winding-up" of any part of the flexible control line means. Heretofore, this desirable result has been accomplished solely by the use of complex and expensive controls requiring a greater number of parts and a more complicated structure. It is also to be noted that the use of a beaded chain permits easy and rapid adjustment of the diameter of the controlled flight circle without changing or resetting any part of the novel control assembly.

This control arrangement also provides for operating aircraft 16 in a clockwise or counter-clockwise circle. The reversal of direction is obtained by merely crossing control lines 138 and 140 at 142 and 144, respectively, and connecting control lines 138, 140 at the opposite end of the aircraft wing. The aircraft can be started in the reverse direction by placing the opposite end of stake 130 in the ground and thus reversing holding clamp 114.

While the present invention has been described in connection with certain embodiments, it is to be understood that the foregoing description is merely exemplary and the concept of this invention is susceptible of numerous other modifications, variations and applications which will be apparent to persons skilled in the art. This invention is intended to be limited only by the broad scope of the appended claims.

I claim:
1. A model aircraft control device comprising a pylon having a base portion, a lateral wall portion connected to said base portion and extending in an upright direction from said base portion, a top portion mounted on said lateral wall portion and spaced from said base portion, an arcuate hollow guide tube disposed in said pylon and having a lower end portion fixed in said lateral wall portion, base means securing an upper end portion of said guide tube in said top portion of said pylon, a control arm assembly comprising a hollow first arm portion mounted for rotation in said base means on said top portion of said pylon in alignment with said upper end portion of said guide tube, said base means comprising an elongated body having a longitudinal opening therethrough, a threaded portion defining an end of said opening, a radially enlarged portion longitudinally fixed on said hollow first arm portion, a threaded fitting threadedly fixed in said threaded portion to maintain said hollow first arm portion in axial assembly with said base means and allow freedom of rotation between said hollow first arm portion and said base means, a second arm portion secured to said first arm portion, a control transmission bar pivotally mounted intermediate the ends thereof on said second arm portion, a universal swivelling tension means freely reciprocable in said guide tube and said first arm portion, said tension means being connected at one end to said control transmission bar and being adapted to be actuated to pivot said transmission bar with respect to said second arm portion, and spring means on said control arm assembly biasing said transmission bar in a direction to tension said tension means.

2. A device according to claim 1 comprising a control stick means connected to said universal swivelling means and being disposed remote from said tower means.

3. A device according to claim 2 wherein said control stick means is comprised of a first portion adapted to be fixed with respect to said tower means, a manually movable means disposed coaxially with said first portion and coil spring means connecting said first portion and said manually movable means whereby said manually movable means is universally positionable.

4. A control device comprising stationary hollow upright housing means, a top portion fixed to said housing means, an arcuate tube disposed in said housing and having a lower end portion extending through said housing and supported therein adjacent a lower portion of said housing, a mounting base member fixed in said top portion of said housing and having an opening therethrough, said opening being threaded at an upper end portion thereof, an upper end of said arcuate tube fixed in said mounting base member, a first hollow arm disposed above said housing and having a vertical portion disposed in said mounting base member, a radially enlarged portion longitudinally fixed on said vertical portion of said first hollow arm, a threaded fitting threadedly engaged in said threaded portion of said opening in said mounting base member to maintain said first hollow arm in axial assembly with said mounting base member but allowing said first hollow arm to rotate with respect thereto, further arm means fixed to said first arm, a control bar pivoted on said further arm means, a universal swivelling tension means freely reciprocable in said arcuate tube and said first hollow arm and connected to said control bar, aircraft control lines adapted to be connected to said control bar whereby linear movement of said tensioning means controls the flight pattern of an aircraft.

References Cited in the file of this patent
UNITED STATES PATENTS

| | | |
|---|---|---|
| 2,067,258 | Christiansen | Jan. 12, 1937 |
| 2,067,828 | Christiansen | Jan. 12, 1937 |
| 2,432,119 | Nash et al. | Dec. 9, 1947 |
| 2,499,666 | Mikolajczyk | Mar. 7, 1950 |
| 2,650,827 | Hamilton | Sept. 1, 1953 |
| 2,692,775 | Marsh | Oct. 26, 1954 |
| 2,825,562 | Clarkson | Mar. 4, 1958 |